(12) United States Patent
Cook et al.

(10) Patent No.: US 11,226,642 B2
(45) Date of Patent: Jan. 18, 2022

(54) ZIPPER MANIFOLD ARRANGEMENT FOR TRAILER DEPLOYMENT

(71) Applicant: FMC Technologies, Inc., Houston, TX (US)

(72) Inventors: James Cook, Houston, TX (US); Corey Massey, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 294 days.

(21) Appl. No.: 15/942,648

(22) Filed: Apr. 2, 2018

(65) Prior Publication Data

US 2018/0284816 A1    Oct. 4, 2018

Related U.S. Application Data

(60) Provisional application No. 62/480,834, filed on Apr. 3, 2017.

(51) Int. Cl.
| | | |
|---|---|---|
| *E21B 43/26* | (2006.01) | |
| *G05D 7/06* | (2006.01) | |
| *B60P 3/40* | (2006.01) | |
| *B62D 21/20* | (2006.01) | |

(52) U.S. Cl.
CPC .............. *G05D 7/0664* (2013.01); *B60P 3/40* (2013.01); *B62D 21/20* (2013.01); *E21B 43/26* (2013.01); *G05D 7/0652* (2013.01)

(58) Field of Classification Search
CPC .......... E21B 21/08; E21B 21/10; E21B 43/26; E21B 34/00; E21B 33/068; E21B 34/02; E21B 43/12; E21B 33/062; E21B 43/267; E21B 21/01; E21B 43/2607; F17D 5/00; Y10T 137/6855; Y10T 137/87917; F16L 55/07; G05D 7/0664; G05D 7/0652; B60P 3/40; B62D 21/20; B67D 9/02; B57D 7/002; E02F 9/2267
USPC ..... 137/613, 899, 615; 166/316–334.4, 85.1, 166/177.5; 141/387
See application file for complete search history.

(56) References Cited

U.S. PATENT DOCUMENTS

| | | | | |
|---|---|---|---|---|
| 1,593,601 | A * | 7/1926 | Rush ..................... | G05D 16/163 137/486 |
| 1,621,712 | A * | 3/1927 | Dawson .................. | F16K 3/029 137/270 |
| 1,684,651 | A * | 9/1928 | Wayman .................. | F16K 39/04 137/1 |
| 1,966,809 | A * | 7/1934 | Wickersham ......... | E21B 33/062 251/1.3 |
| 4,230,299 | A * | 10/1980 | Pierce, Jr. ............... | E21B 34/02 137/315.28 |
| 4,874,008 | A * | 10/1989 | Lawson .................. | E21B 34/04 137/315.09 |

(Continued)

*Primary Examiner* — Craig J Price
(74) *Attorney, Agent, or Firm* — Osha Bergman Watanabe & Burton LLP (57) ABSTRACT

A zipper manifold for use in wellbore operations includes a trunk line having a first longitudinal axis, an inlet on a first axial end, an outlet on a second axial end, and a first gate valve positioned between the inlet and the outlet, a block tee fluidly connecting the trunk line to a secondary line, the secondary line having a second longitudinal axis parallel to the first longitudinal axis, a second gate valve positioned along the secondary line, and an outlet head at an end of the secondary line.

12 Claims, 4 Drawing Sheets

(56) References Cited

U.S. PATENT DOCUMENTS

| | | | |
|---|---|---|---|
| 7,073,592 B2* | 7/2006 | Polsky | E21B 19/22 166/360 |
| 8,376,046 B2* | 2/2013 | Broussard, II | E21B 43/26 166/308.1 |
| 8,474,521 B2* | 7/2013 | Kajaria | E21B 43/26 166/85.1 |
| 8,752,632 B2* | 6/2014 | Agerbæk | E21B 33/068 166/344 |
| 9,127,545 B2* | 9/2015 | Kajaria | E21B 43/26 |
| 9,239,125 B2* | 1/2016 | Ungchusri | F17D 1/08 |
| 9,568,138 B2* | 2/2017 | Arizpe | F16F 7/14 |
| 9,903,190 B2* | 2/2018 | Conrad | E21B 43/26 |
| 10,253,585 B2* | 4/2019 | Hickie | E21B 21/106 |
| 10,323,475 B2* | 6/2019 | Christopherson | E21B 33/068 |
| 10,385,645 B2* | 8/2019 | Guidry | F16L 15/02 |
| 10,392,914 B2* | 8/2019 | Kajaria | F16L 55/07 |
| 10,422,483 B2* | 9/2019 | Cook | F17D 5/00 |
| 10,570,692 B1* | 2/2020 | Sizemore | E21B 33/068 |
| 10,738,552 B1* | 8/2020 | Parker | G05D 7/0664 |
| 10,801,294 B2* | 10/2020 | Jespersen | E21B 43/12 |
| 10,876,371 B2* | 12/2020 | Guidry | E21B 33/068 |
| 10,890,297 B2* | 1/2021 | Scott | E21B 43/2607 |
| 10,920,520 B2* | 2/2021 | Kendrick | E21B 33/068 |
| 2011/0030951 A1* | 2/2011 | Irvine | E21B 37/08 166/278 |
| 2011/0048695 A1* | 3/2011 | Cherewyk | E21B 21/062 166/90.1 |
| 2011/0259584 A1* | 10/2011 | Broussard, II | E21B 43/26 166/271 |
| 2012/0181015 A1* | 7/2012 | Kajaria | E21B 43/26 166/177.5 |
| 2012/0181046 A1* | 7/2012 | Kajaria | E21B 43/16 166/380 |
| 2012/0214174 A1* | 8/2012 | Katagiri | G01N 33/57415 435/7.23 |
| 2014/0217320 A1* | 8/2014 | DeOcampo | F16K 3/0254 251/326 |
| 2015/0184491 A1* | 7/2015 | Kajaria | E21B 43/26 166/90.1 |
| 2015/0292297 A1* | 10/2015 | Kajaria | E21B 34/02 166/250.01 |
| 2016/0060893 A1* | 3/2016 | Roodenburg | E04H 12/187 52/123.1 |
| 2016/0168940 A1* | 6/2016 | McMiles | E21B 33/064 166/363 |
| 2016/0319650 A1* | 11/2016 | Oehring | E21B 43/267 |
| 2016/0376864 A1* | 12/2016 | Roesner | E21B 33/068 166/308.1 |
| 2017/0010139 A1* | 1/2017 | Vilstrup | E21B 43/12 |
| 2017/0122060 A1* | 5/2017 | Dille | B60P 3/2205 |
| 2017/0123437 A1* | 5/2017 | Boyd | F17D 5/00 |
| 2017/0138144 A1* | 5/2017 | Christopherson | E21B 33/068 |
| 2017/0268306 A1* | 9/2017 | Kajaria | B60P 3/2265 |
| 2017/0342792 A1* | 11/2017 | McHugh | E21B 49/08 |
| 2018/0073308 A1* | 3/2018 | Tran | F16L 27/053 |
| 2018/0171770 A1* | 6/2018 | Roesner | E21B 43/267 |
| 2018/0347286 A1* | 12/2018 | Scott | E21B 17/021 |
| 2019/0383125 A1* | 12/2019 | Koricanek | F16L 23/20 |
| 2020/0048980 A1* | 2/2020 | Jespersen | E21B 34/02 |
| 2020/0131877 A1* | 4/2020 | Guidry | E21B 43/26 |
| 2020/0325752 A1* | 10/2020 | Clark | E21B 43/2607 |
| 2020/0400003 A1* | 12/2020 | Webster | E21B 34/02 |
| 2021/0010358 A1* | 1/2021 | Guidry | E21B 43/26 |
| 2021/0017830 A1* | 1/2021 | Witkowski | F16K 5/04 |

* cited by examiner

ZIPPER MANIFOLD ARRANGEMENT FOR TRAILER DEPLOYMENT

CROSS-REFERENCE TO RELATED APPLICATIONS

This application claims benefit, under 35 U.S.C. § 119, of U.S. Provisional Application Ser. No. 62/480,834 filed on Apr. 3, 2017 and entitled "Zipper Manifold Arrangement for Trailer Deployment." The disclosure of this U.S. Provisional Application is incorporated herein by reference in its entirety.

BACKGROUND

High pressure well service pumping units are often used in the hydrocarbon production industry to inject a variety of fluids into an oil or gas well during certain well servicing operations. For example, during a fracturing operation, such pumping units are used to inject a particle-containing slurry into the well in order to fracture the hydrocarbon bearing formation and thereby produce channels within the formation through which the oil or gas may flow.

Typical fracturing operations require the use of several pumping units operating in unison to inject a large volume of slurry into the well. The pumping units are mounted on respective trucks or trailers which are parked close together and the discharge pipe assembly of each pumping unit is connected to the so called main line of a collection manifold which is located on a separate manifold trailer.

The connection between each pumping unit and the main line is usually made using a temporary flow line comprising a collection of individual and pre-assembled pipes and swivel joints which are secured together by clamps or connectors. The flow line components are stowed on the truck or trailer in compact configurations and when the truck or trailer reaches the job site they must be unfolded and assembled in order to extend the flow line to the main line. However, this operation is time consuming, especially when multiple pumping units must be connected to the main line.

In addition, a common practice is to run a flow line from a truck or trailer to the ground and then from the ground to the collection manifold to provide adequate support for the flow line. However, this requires that each flow line be made up of several swivel joints comprising multiple swivel connections, and parts of the flow line which rest on the ground can experience undue wear that may shorten the life of these components. Furthermore, numerous installed flow lines create cramped and cluttered conditions in the area between the pumping units and the manifold trailer, which can be a safety hazard for persons assembling and maintaining the flow lines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a zipper manifold for use in wellbore operations that includes a trunk line having a first longitudinal axis, an inlet on a first axial end, an outlet on a second axial end, and a first gate valve positioned between the inlet and the outlet. A block tee may fluidly connect the trunk line to a secondary line, the secondary line having a second longitudinal axis parallel to the first longitudinal axis. A second gate valve may be positioned along the secondary line, and an outlet head may be at an end of the secondary line.

In another aspect, embodiments of the present disclosure relate to a modular trailer assembly for transporting fracturing equipment to a well site that includes at least one manifold trailer assembly having one or more zipper manifold modular skids mounted to a trailer. Each of the zipper manifold modular skids may include a trunk line having an inlet on a first axial end, an outlet on a second axial end, and a first gate valve positioned between the inlet and the outlet, a secondary line fluidly connected to the trunk line by a block tee, an outlet head disposed on a terminal end of the secondary line, and at least one secondary gate valve disposed on the secondary line between the outlet head and the block tee, wherein the trunk line and the secondary line are in a parallel arrangement.

In yet another aspect, embodiments of the present disclosure relate to a manifold that includes a trunk line having an inlet and an outlet at opposite axial ends, a secondary line fluidly connected to the trunk line via a vertical flow line, wherein the secondary line and the trunk line extend substantially along separate horizontal planes, an outlet head disposed at an end of the secondary line, and at least one gate valve disposed along each of the trunk line and the secondary line.

Other aspects and advantages of the invention will be apparent from the following description and the appended claims.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Once a pad of frac wells is completed through the production casing stage, the drilling crew may be dismissed and a frac crew arrives. A well may be capped with a "frac tree" following completions that provides a connection to fracturing equipment used to deliver treatments at high pressures to induce formation fractures for enhanced hydrocarbon recovery. A frac manifold may then be placed in close proximity to the wells to be serviced. High-pressure frac fluid may be routed from nearby frac trucks through a frac pump output header, or "missile," and to the frac manifold. Supply lines of the frac manifold may terminate in an outlet head (often referred to as a goat head or frac head in the industry) that connects to valve fittings at the top of a frac tree for each well. Outlet heads may be designed to ensure efficient and safe hydraulic fracturing fluid flow when pumping high volumes at extreme pressures during the fracturing.

Frac manifolds may isolate wells that have completed a frac cycle and for which interventions, such as plug and perforation operations, are to be conducted, and may redirect fluid flow to a well prepared for the next frac cycle. Frac manifolds may allow sequential downhole operations using actuated valves, reducing the safety risks and improving the transition speeds without the need for manual adjustments. The use of a frac manifold in this manner is called "zipper" or "zip" fracturing, and may provide almost continuous utilization of the frac crew and equipment, from the first treatment at the toe of the first well to the last treatment at the heel of the last well. Accordingly, a frac manifold used in this manner may also be referred to as a zipper manifold. Typical components of a zipper manifold may include spools, tees, crosses, gate valves, and outlet heads. Zipper manifolds may have a number of configurations to suit the number and spacing of wells being serviced, the planned arrangement of the frac lines, the extent to which actuation is desired, and the like.

Embodiments of the present disclosure are directed to a modular system for a customizable zipper manifold. In one or more embodiments, zipper manifolds may be assembled from modular skids that create a customizable number of branches to service any number of frac trees and/or well heads at a given site.

Modular skids according to embodiments of the present disclosure may have standardized uniform mounting footprints, whether same-type or different-type equipment is mounted to the modular skids. In other words, a modular skid system according to embodiments of the present disclosure may include modular skids having same and/or different equipment configurations held on each modular skid, where each modular skid in the modular skid system may have the same mounting footprint. As used herein, a mounting footprint may refer to the shape and size (e.g., width and length) of a base of a modular skid. Thus, modular skids having different equipment units may have the same mounting footprint whether or not the different equipment units have different heights and/or elements of the different equipment units have different dimensions that swing or extend outward of the modular skid mounting footprint. For example, a modular skid system according to embodiments of the present disclosure may have a first modular skid with one or more elements of the equipment (e.g., a valve actuator or a valve connection flange) at a height above the first modular skid base and extending a distance outside of the first modular skid base width/length dimensions, and a second modular skid with an equipment unit configuration different from the first modular skid equipment, where both the first and second modular skids may have the same mounting footprint (e.g., a base with substantially the same width/length dimensions).

In some embodiments, a modular skid system may include one or more modular skids having a mounting footprint with one or more irregularities compared with the mounting footprints of the remaining modular skids, such that the modular skids in the modular skid system have substantially the same mounting footprints (i.e., have the same general base dimensions not including the one or more irregularities). For example, in some embodiments, a modular skid system having modular skids with bases of the same general width and length and with connection points at axial ends of the base length may include a Tee-configuration modular skid having base with an additional connection point extending past the width of the majority of the base, while the remaining modular skids in the modular skid system may have bases without such irregularities in the base width formed by an additional connection point. In such embodiments, the Tee-configuration modular skid may be said to have the same mounting footprint as the remaining modular skids in the modular skid system.

The size of modular skids (including the size of modular skid mounting footprints, modular skid heights, equipment configurations arranged on the modular skids, etc.) may be selected based, for instance, on the size limitations of common transportation means, Department of Transportation ("DOT") requirements (e.g., to meet weight and size limits of loads being transported on roads by trailers), the type of function each modular skid is to perform, and/or to provide reduced cost and reduced time to manufacture. For instance, the size of the mounting footprint of modular skids may be selected so that three modular skids may fit end to end on a flatbed trailer. In some embodiments, the overall size of modular skids (including the mounting footprints and the size of the equipment held on the modular skids) may be selected such that one or more modular skids may be mounted to a flatbed trailer and also meet DOT regulations for transporting the loaded flatbed trailer.

For example, according to embodiments of the present disclosure, a modular skid may have a mounting footprint having a length ranging from, e.g., a lower limit selected from 7 ft, 10 ft or 14 ft to an upper limit selected from 14 ft or 28 ft, and a width ranging from, e.g., a lower limit selected from 4 ft, 6 ft or 8 ft to an upper limit selected from 6 ft, 8 ft, 10 ft, or 12 ft, where any lower limit may be used in combination with any upper limit. For example, in some embodiments, a modular skid may have a mounting footprint of about 8.5 ft wide and about 11.5 ft long. However, the dimensions of the mounting footprint of a modular skid may vary within the above-mentioned ranges or may be outside of the above-mentioned ranges, depending, for example, on the job the modular skid is designed to perform, DOT regulations, and/or other factors. For example, in some embodiments, the length of the mounting footprint for a modular skid may be designed to correspond with pump spacing when the modular skid is to be used in a pumping operation.

Further, in some embodiments, a modular skid may have a height ranging from, e.g., a lower limit selected from 2 ft, 4 ft or 6 ft to an upper limit selected from 10 ft, 14 ft, or 18 ft, where any lower limit may be used in combination with any upper limit. However, the height of a modular skid may be outside the above-mentioned ranges, depending, for example, on the job the modular skid is designed to perform, DOT regulations, and/or other factors. For example, in some embodiments, modular skids may be designed to have the same or different heights (depending on the types of equipment units being held on each modular skid), where the height of each of the modular skids may be about 10.6 ft or less. In instances where modular skids are being transported on a trailer (and DOT height regulations apply), the height of modular skids may be designed to be no greater than the regulation height minus the height of the trailer on which the modular skids are mounted to.

Zipper manifold modular skids in accordance with the present disclosure may have a general structure that includes a primary flow bore having a secondary line that diverts to form a connection to a well head. In one or more embodiments, the secondary line may be positioned above and parallel (or substantially parallel) to the primary flow bore. By arranging the primary and secondary flow lines in such a "folded over" configuration, the footprint of the zipper manifold modular skid, and the resulting zipper manifold, maintains a compact footprint that may be deployed on one or more trailers that meet Department of Transportation (DOT) mandated regulations for travel on roadways. As used herein, "DOT-compliant" is used to designate that an assembled trailer complies with DOT size regulations or that a zipper manifold modular skid has a form factor that complies with DOT size regulation when assembled on a trailer. Embodiments of the present disclosure may or may not require overweight permits to comply with DOT regulations.

Other parallel arrangements of a primary trunk line (having a primary flow bore therethrough) and a secondary line may be envisioned. For example, a primary trunk line and a secondary line in a zipper manifold modular skids may be in a vertically stacked and parallel arrangement. In some embodiments, a primary trunk line and a secondary line may be in a side-by-side parallel arrangement. A primary trunk line and a secondary line in a zipper manifold modular skid according to embodiments of the present disclosure may have various parallel arrangements (e.g., vertically stacked parallel arrangements, side-by-side parallel arrangements, and/or a parallel arrangement with the secondary line arranged at an angular position around the primary trunk line).

Zipper manifolds in accordance with the present disclosure may have a compact structure that stems from the primary trunk line that occupies a small footprint relative to standard vertical and horizontal zipper manifolds. In some embodiments, the modular nature of the zipper manifolds of the present disclosure may allow a customized trailer to be assembled that is responsive to the needs at the well site, ensuring that the manifold can withstand the expected pumping rates and is equipped with a sufficient number of pumps and well connections. Zipper manifold modular skids in accordance with the present disclosure may be assembled into zipper manifolds having any number of outlet heads, which may be delivered to the site ready for operation, avoiding the downtime associated with unfolding and/or assembling conventional zipper manifolds at the well site. Outlet heads in accordance with the present disclosure include mono-blocks with multiple discharge flanges and other commercially available solutions to connect manifolds to ground irons, frac trees, or other wellhead configurations.

Zipper manifold modular skids in accordance with the present disclosure may include a primary trunk line, a number of gate valves, a block tee for diverting fluids from the primary trunk line to a secondary line, and an outlet head. In some embodiments, zipper manifold modular skids may include a primary trunk line having a first gate valve that diverts fluids (and/or gases in some embodiments) into a secondary line when closed. For example, when a first gate valve (which may be referred to as a diverter valve) along a primary trunk line is closed, fluid may be diverted into the secondary line and flow therethrough, assuming the valves along the secondary line are open. When the first gate valve along the primary trunk line is open, fluids may proceed through the primary trunk line until it either deadheads against a closed valve(s) or is diverted into another secondary line. In one or more embodiments, zipper manifold modular skids may utilize a gate valve on the primary trunk line to divert flow up into the zipper manifold, which may prevent the occurrence of "sand-offs" in the main trunk lines of the unused zipper manifolds.

The secondary line branching from the primary trunk line may also be equipped with a second gate valve that controls the flow of fluids received upon activation of the first gate valve. In one or more embodiments, the second gate valve may be manually operated or may be under automated control using hydraulic actuation, for example. In some embodiments, the first gate valve and/or second gate valve may contain multiple valves. For example, the second valve may be a dual valve block equipped with both a hydraulic valve and a manual valve to provide operational flexibility. Dual valve blocks may allow for hydraulic operation for automation and remote control of a specific well, while also having manual options for closing the valve during emergent situations and hydraulic failure. In some embodiments, the second valve may be a dual valve block equipped with two electrically or hydraulically actuated valves. In some embodiments, the second valve may be a dual valve block equipped with two manual valves.

Figure 1:
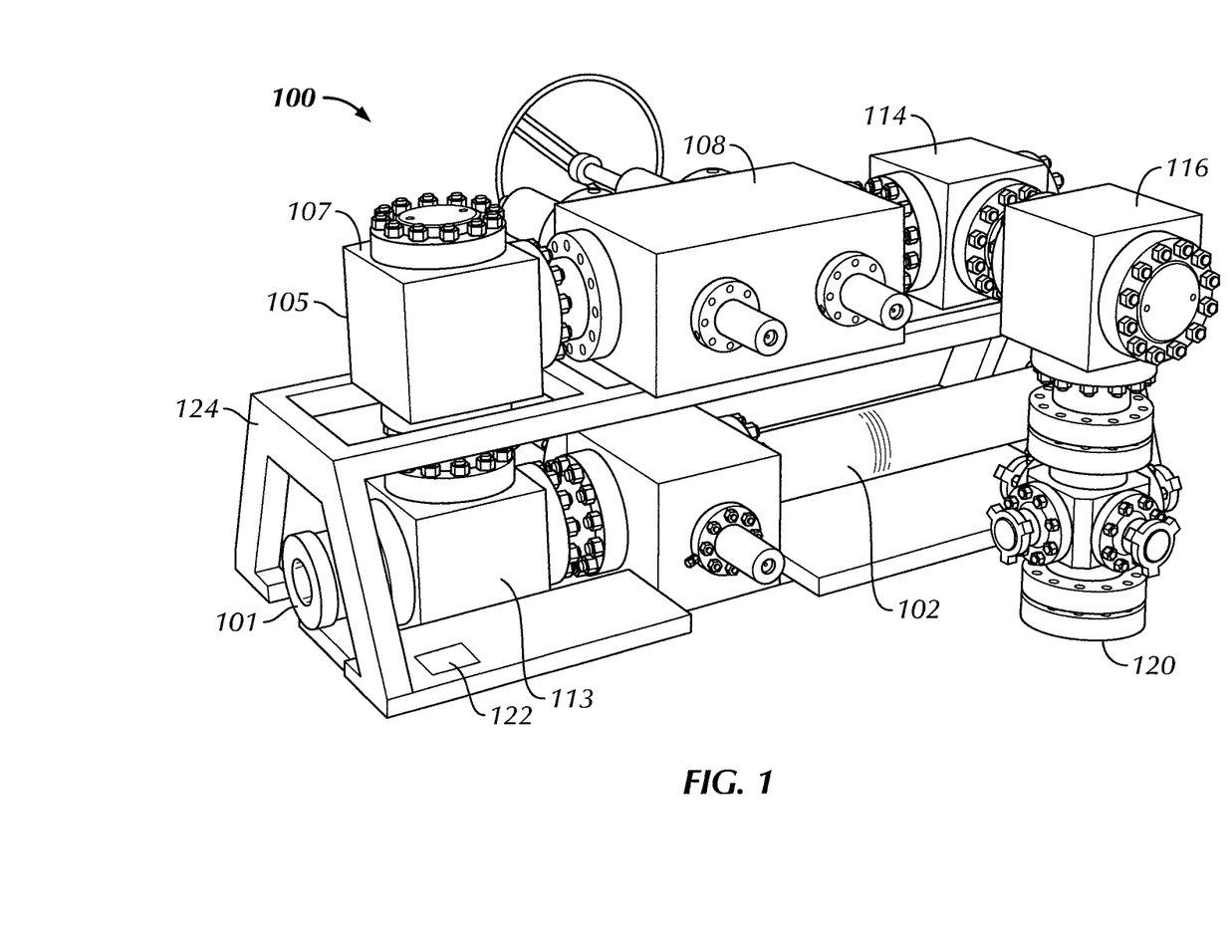
FIGS. 1 and 2 are illustrations of a zipper manifold modular skid in accordance with embodiments of the present disclosure.
Figure 2:
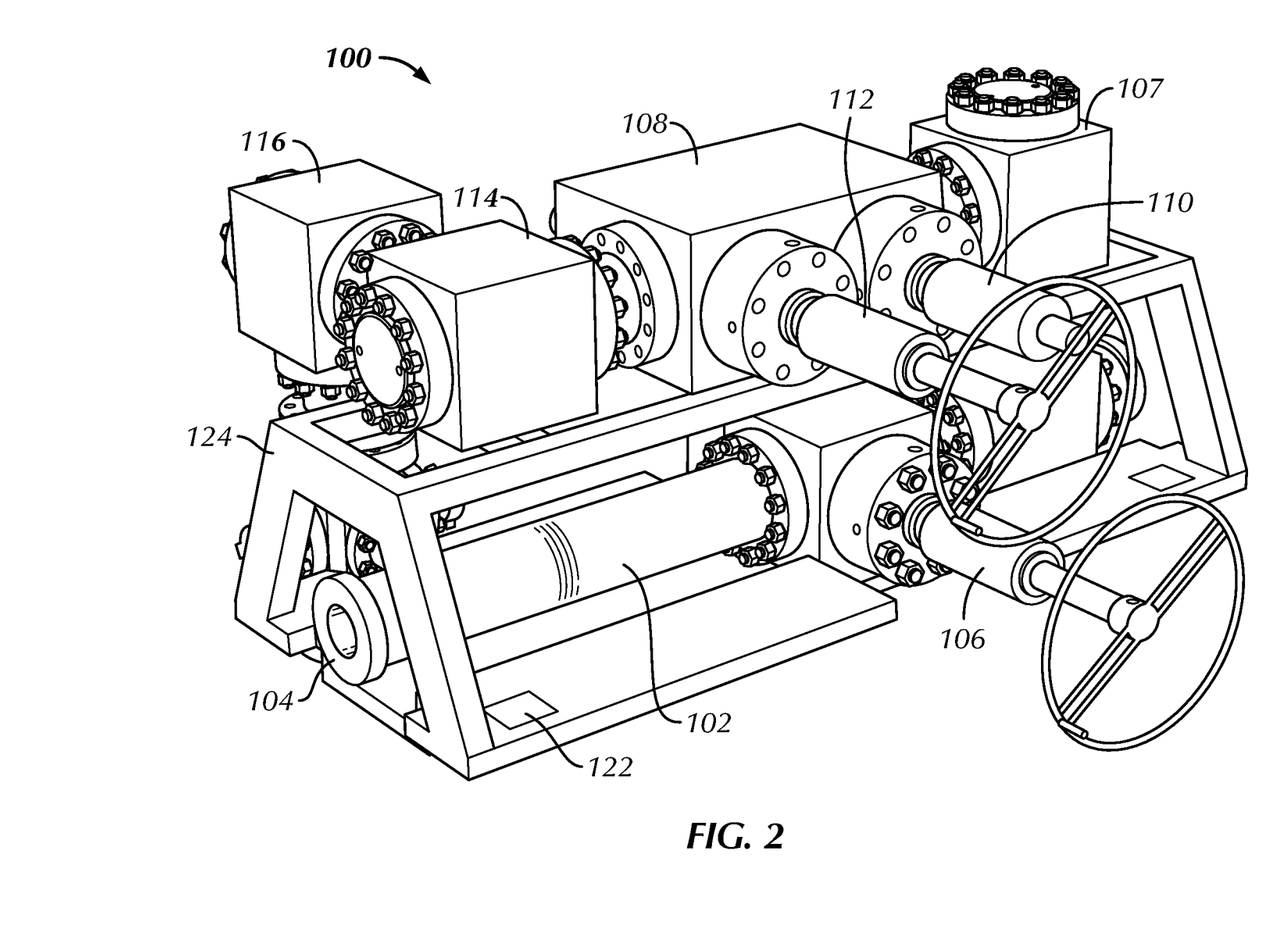

With respect to FIGS. 1 and 2, two views of a zipper manifold modular skid in accordance with the present disclosure are shown. Zipper manifold modular skid 100 is a modular unit that may be mounted on a support structure, the ground, or a trailer for deployment. Primary trunk line 102 has an inlet 101 on a first axial end and outlet 104 on a second axial end that allow the modular skid to be connected in sequence with additional zipper manifold modular skids or modular skids that perform other functions. The conduit created by primary trunk line 102 traverses a first gate valve 106, such as a diverter 7"-10 k gate valve or similar, that allows gas or liquid flow through the primary trunk line to be diverted through a branch point, such as block tee 113. When closed, gate valve 106 on the primary trunk line 102 may prevent "sand-offs" of an unused mainline.

The secondary line 105 may be arranged in a stacked configuration over the primary trunk line 102 to form a parallel, or substantially parallel, second longitudinal axis to the first longitudinal axis created by the primary trunk line. Further, outlet head 120 may be arranged to one side of zipper manifold modular skid 100 by redirecting a portion of the secondary line 105 in a direction away from the horizontal plane and down a vertical direction perpendicular to the longitudinal axis of secondary line 105. In the embodiment pictured in FIGS. 1 and 2, the secondary line 105 may be diverted from the primary trunk line 102 by standard equipment such as a first elbow 107, which redirects the flow to second gate valve 108. When second gate valve 108 is opened, the flow traverses the secondary line 105 to a second elbow 114 that redirects the flow to a third elbow 116 and down a vertical axis perpendicular to the longitudinal axis created by the secondary line 105 to outlet head 120. In the embodiment shown, the elbows 107, 114, 116 have a 90 degree turns. However, other configurations in accordance with embodiments of the present disclosure may be envisioned using elbows with differently angled turns (e.g., more or less than 90 degrees). Further, the orientation of the valve controls and the location of the outlet head may be arranged on either side of the modular skid without departing the scope of the instant disclosure.

The secondary line leading from the block tee 113 may be equipped with a second gate valve 108 that may be manual and/or hydraulically actuated. In one or more embodiments, hydraulic connections may be used to enable remote operation of equipped valves, and at least one hydraulic actuator may be connected to at least one of the first gate valve 106 and the second gate valve 108. In some embodiments, the second gate valve may be a dual valve, such as the one pictured, having a hydraulic actuator valve 110 and a manual valve 112 to open/close flow to a specific well. Dual valve blocks may be selected from commercially available gate valves in some embodiments, including gate valves such as a 7"-10K Dual Valve Block.

In some embodiments, the outlet head 120 may be situated at one side of a trailer to improve ground access to connections (placed at a similar height as horizontal tree piping, for example) used to rig up to frac trees and other well head connections. Zipper manifold modular skids may be designed such that, when mounted on a trailer the outlet head is from 0.5 to 9 feet above the ground in some embodiments, and from 1 to 8 feet in other embodiments.

In one or more embodiments, zipper manifold modular skids may incorporate a support frame 124 that supports all or a portion of the structural piping of the primary trunk line and/or the secondary line. In some embodiments, the support frame 124 may support the secondary line along the longitudinal axis 105, and may be dimensioned having a height, width, and length such that the outlet head 120 extends outside of the footprint created by the frame. For example, the support frame 124 may create the footprint of the zipper manifold modular skid that rests on a transport trailer, while the outlet head 120 extends outside of the footprint of the support structure and off to a side of the trailer to enable access to well head connections.

In one or more embodiments, zipper manifold modular skids in accordance with the present disclosure may be mounted to a common chassis, such as a trailer or skid, using any type of mount including industry standardized mounts such as ISO blocks and twistlocks. With particular respect to FIGS. 1 and 2, a number of ISO connectors 122 are present on the corners of zipper manifold modular skid 100 to allow engagement with corresponding ISO retractable twistlocks to secure zipper manifold modular skids to a trailer chassis. In some embodiments, ISO connectors 122 may be incorporated into support frame 124 and used to mount the zipper manifold modular skid 100 to a trailer or skid.

In one or more embodiments, zipper manifold modular skids in accordance with the present disclosure may have a form factor that allows one or more modular skids to be assembled on a trailer to enable transport to and disposition at a well site. One skilled in the art will appreciate how a modular skid system (e.g., a system of connected-together modular skids for performing hydraulic fracturing operations) may include the desired number of zipper manifold modular skids 100 as needed per job requirements. The zipper manifold modular skids 306 may then form a larger zipper manifold that may be connected by conduits to well heads, missiles, and other hydraulic fracturing equipment.

Figure 3:
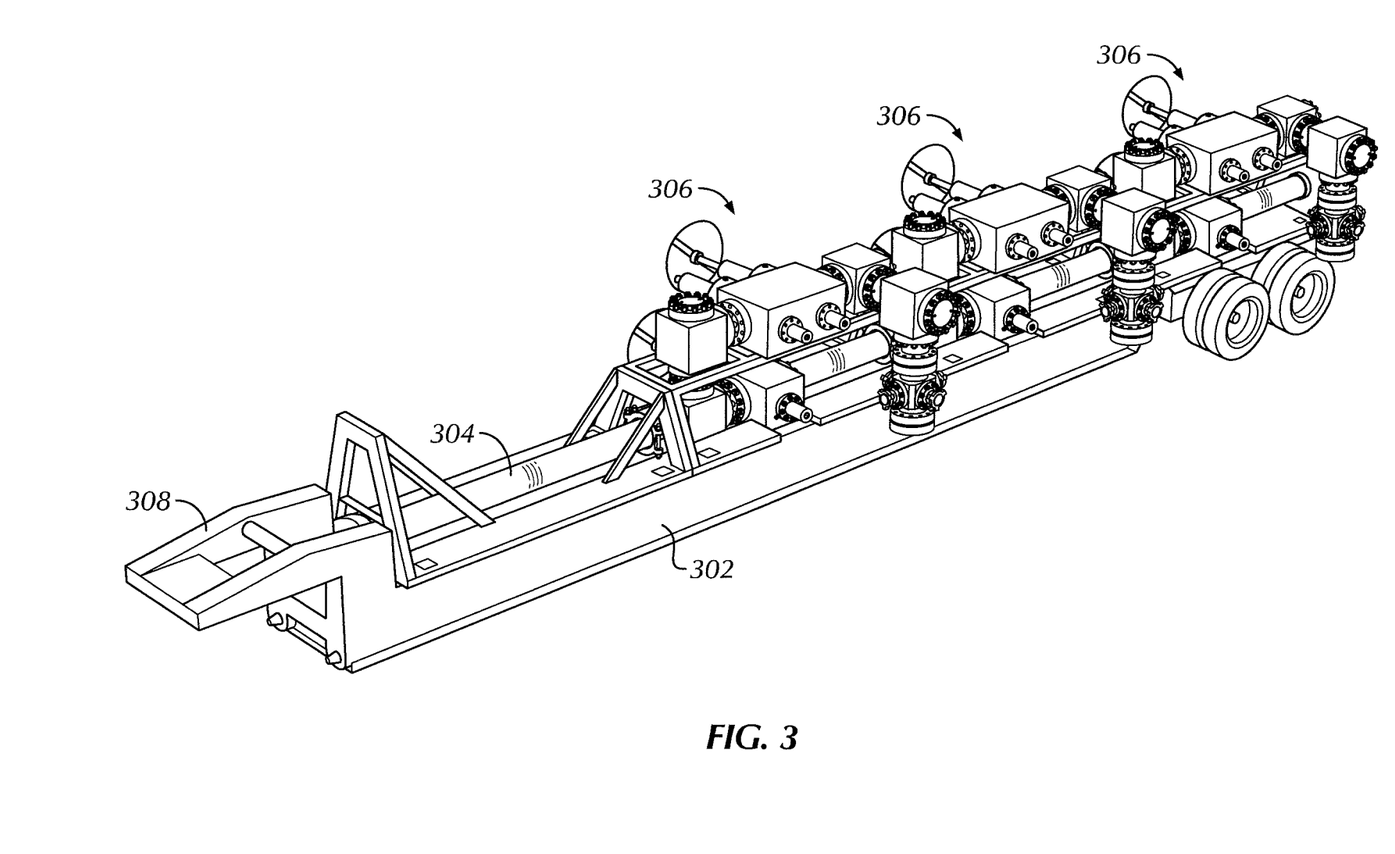
FIGS. 3 and 4 are illustrations of a modular trailer platform equipped with a number of zipper manifold modular skids in accordance with embodiments of the present disclosure.
Figure 4:
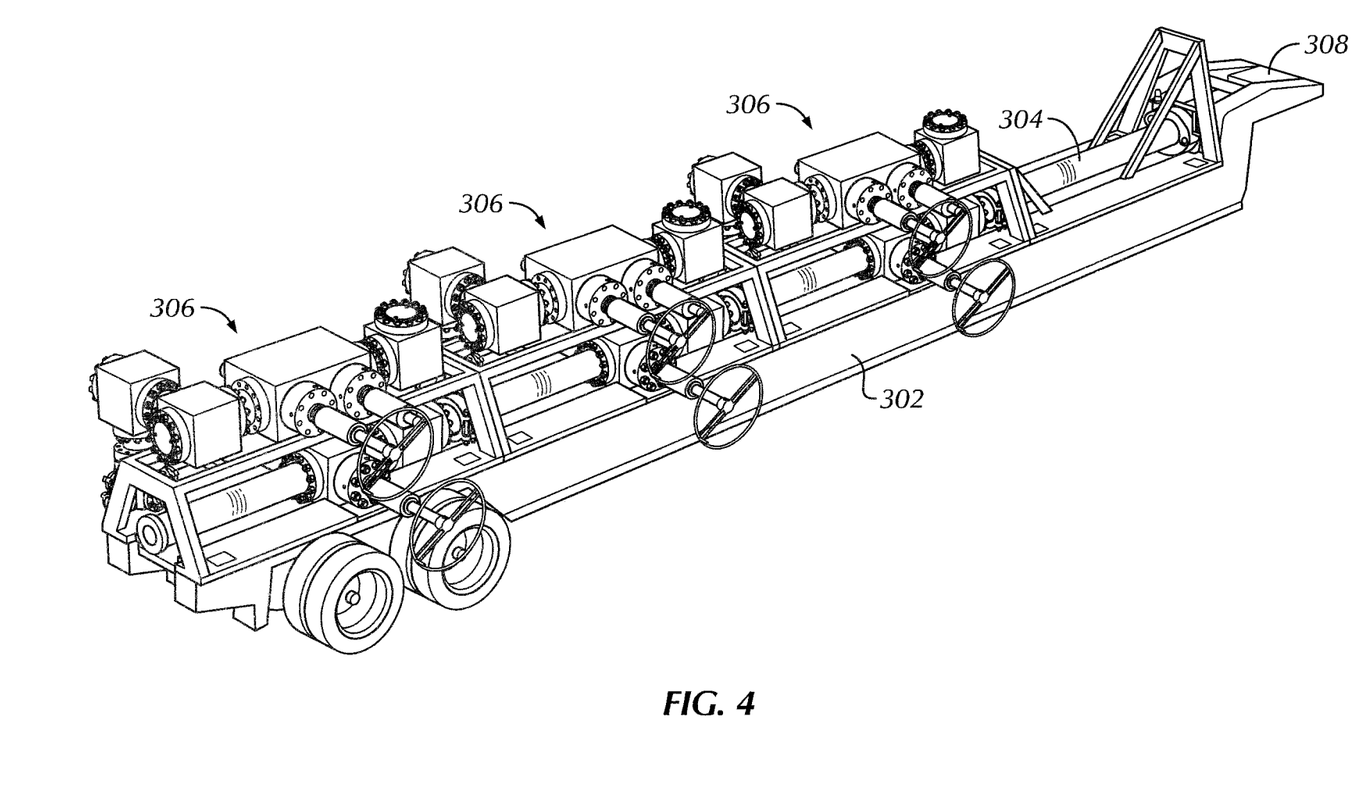

With respect to FIGS. 3 and 4, an embodiment of a modular trailer platform is shown in accordance with the present disclosure. The modular trailer platform 302 is shown in one configuration with spacer modular skid 304, and three zipper manifold modular skids 306 connected together in an axial end-to-axial end configuration. The modular trailer platform 302 includes a chassis for mounting various component modular skids, which is supported on a number of wheels to allow the trailer to be towed between various locations using standard equipment such as trailer hitch 308. In some embodiments, zipper modular skids form part of a larger modular assembly and may be used in combination with a number of standardized modular skids, such as the spacer modular skid 304. In one or more embodiments, two or more modular trailer platforms and assemblies may be interconnected end-to-end, side-by-side, or end-to-side, depending on the nature of the conduit connections, to provide access to multiple component modular skid arrangements. Multiple trailer arrangements provide operational flexibility for sites that may require additional manifold ports, pumping capacity, or other functionality.

Once assembled, zipper manifold-equipped trailers may be transported to a well site to perform servicing operations from the trailer without the need for expansion or unpacking of the manifold. The use of the trailer configuration may minimize the need for separate connections between a wellbore fluid source, each high-pressure pumping unit, and the wellhead. Zipper manifolds in accordance with the present disclosure also facilitate quick redirection of fracturing pressure from one well to another, enabling pump trucks to run nearly continuously to minimize downtime.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A zipper manifold for use in wellbore operations, comprising:
    a trunk line comprising:
        a first longitudinal axis;
        an inlet on a first axial end;
        an outlet on a second axial end; and
        a first gate valve positioned between the inlet and the outlet, wherein the first gate valve traverses the first longitudinal axis;
    a block tee fluidly connecting the trunk line to a secondary line, the secondary line having a second longitudinal axis parallel to the first longitudinal axis;
    a second gate valve positioned along the secondary line; and
    an outlet head connected at an end of the secondary line via an elbow connection,
    wherein the trunk line and the secondary line are positioned along a plane, and the outlet head is positioned outside the plane,
    wherein the secondary line is vertically stacked over the trunk line, and
    wherein the zipper manifold is provided in a zipper manifold modular skid assembled to and operational on a trailer.

2. The zipper manifold of claim 1, wherein the assembled zipper manifold modular skid and trailer is DOT-compliant.

3. The zipper manifold of claim 1, wherein the zipper manifold further comprises one or more connection points for ISO-type connectors.

4. The zipper manifold of claim 1, wherein the outlet head is configured near ground level at a height ranging from 1 to 8 feet above the ground.

5. The zipper manifold of claim 1, wherein the second gate valve is a dual valve block.

6. The zipper manifold of claim 5, wherein the dual valve block comprises a manual valve and a hydraulic valve.

7. The zipper manifold of claim 1, further comprising at least one hydraulic actuator connected to at least one of the first gate valve and the second gate valve.

8. The zipper manifold of claim 1, further comprising a frame having height, width, and length dimensions, wherein the outlet head extends farther than the width dimension of the frame.

9. A zipper manifold for use in wellbore operations, comprising:
   a frame having height, width, and length dimensions;
   a trunk line extending the length dimension, from a first axial end of the frame to a second axial end of the frame, the trunk line comprising:
      a first longitudinal axis;
      an inlet on the first axial end;
      an outlet on the second axial end; and
      a first gate valve positioned between the inlet and the outlet;
   a block tee fluidly connecting the trunk line to a secondary line, the secondary line extending from the first axial end of the frame to the second axial end of the frame;
   a second gate valve positioned along the secondary line; and
   an outlet head at an end of the secondary line, wherein the outlet head extends farther than the width dimension of the frame, wherein the outlet head is configured to be rigged up to wellhead connections,
   wherein the trunk line and the secondary line are in a vertically stacked arrangement on the frame, and the secondary line having a second longitudinal axis parallel to the first longitudinal axis.

10. The zipper manifold of claim 9, further comprising a first elbow connection fluidly connected to the block tree, wherein the first elbow is configured to redirect a flow path to the second gate valve.

11. The zipper manifold of claim 10, wherein when the second gate valve is opened, the flow path traverses the secondary line to a second elbow connection that redirects the flow path to a third elbow connection and down a vertical axis parallel with the height dimension to the outlet head.

12. The zipper manifold of claim 11, wherein each of the first elbow connection, the second elbow connection, and the third elbow connection have a 90 degree turn.

* * * * *